G. W. JOPSON.
Key-Ring.
No. 168,258.  Patented Sept. 28, 1875.
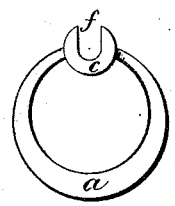
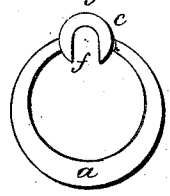
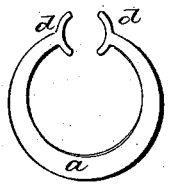 
Witnesses
H. Shumway
Clara Broughton.
Geo. W. Jopson
Inventor
By Atty.

UNITED STATES PATENT OFFICE.

GEORGE W. JOPSON, OF WATERBURY, CONNECTICUT.

IMPROVEMENT IN KEY-RINGS.

Specification forming part of Letters Patent No. 168,258, dated September 28, 1875; application filed September 9, 1875.

*To all whom it may concern:*

Be it known that I, GEO. W. JOPSON, of Waterbury, in the county of New Haven and State of Connecticut, have invented a new Improvement in Key-Rings; and I do hereby declare the following, when taken in connection with the accompanying drawings, and the letters of reference marked thereon, to be a full, clear, and exact description of the same, and which said drawings constitute part of this specification, and represent in—

Figure 1, side view, as in condition for introducing a key; Fig. 2, the same closed; Figs. 3, 4, and 5 detached views.

This invention relates to an improvement in the article known to the trade as key-ring—that is to say, a ring constructed to attach keys together for convenience of carrying; and it consists in a divided ring combined with an open collar, arranged in the division of the ring, and so as to turn freely in the plane of the ring, that when the open side of the collar is presented outward the key may be introduced, and the collar turned until the mouth is presented inward. Then the key is engaged within the ring, as more fully hereinafter described.

*a* is the ring proper, divided at one side, and the two ends *d* constructed upon their adjacent surfaces in segmental form, as shown in Fig. 3. *c* is the collar, a little larger in diameter than the space between the two ends *d*. Around its edge is an annular groove, *e*, which corresponds to the two ends *d* of the ring, and so as to be placed in between the said two ends, the groove serving to retain it in its place transversely.

The collar is constructed with an opening, *f*, to one side, and so that it may be rotated freely in its seat between the two ends. When the collar is placed in position between and so as to unite the two ends of the ring, as seen in Fig. 1—the open side *f* outward—a key, or whatever it is desirable to attach to the ring, is placed into the recess *f*, and, resting there, the collar is turned to the position in Fig. 2, presenting to the interior of the ring, so that the key will fall from the collar and be engaged within the ring. To remove the key, simply reverse the operation.

I claim—

The combination of the divided ring *a* and collar *c*, the two ends of the ring constructed to receive and hold the said collar, and allow the collar to rotate therein, the said collar constructed with an opening, *f*, substantially as and for the purpose specified.

GEORGE W. JOPSON.

Witnesses:
 EDWARD F. COLE,
 JOHN MITCHELL.